(No Model.)

E. STORM.
BUSHING FOR COUPLINGS.

No. 270,857. Patented Jan. 16, 1883.

Witnesses

Inventor
Edward Storm
by his Attorneys
Brown & Brown

UNITED STATES PATENT OFFICE.

EDWARD STORM, OF POUGHKEEPSIE, NEW YORK.

BUSHING FOR COUPLINGS.

SPECIFICATION forming part of Letters Patent No. 270,857, dated January 16, 1883.

Application filed July 31, 1882. (No model.)

*To all whom it may concern:*

Be it known that I, EDWARD STORM, of Poughkeepsie, in the county of Dutchess and State of New York, have invented a new and useful Improvement in Bushings for Couplings, of which the following is a specification.

My invention relates particularly to couplings which are employed to connect the ends of springs to the side bars in side-bar vehicles; but it is also applicable to couplings for other springs. In such couplings the end of the spring or spring-arm is formed with an eye which is adapted to enter between two lugs or ears which project from a clip-plate, and is secured by a bolt inserted through both the eye and lugs or ears.

The object of my invention is to provide a very serviceable and otherwise desirable bushing to fit between the bolt and spring-eye, and also between the sides of the eye and the lugs or ears, and thus prevent the rattling and wearing of these parts.

To this end my invention consists in a bushing for couplings, composed of leather, which is impregnated with plumbago, and which is preferably compressed to increase its density, such bushing being a new article of manufacture.

Figure 1:
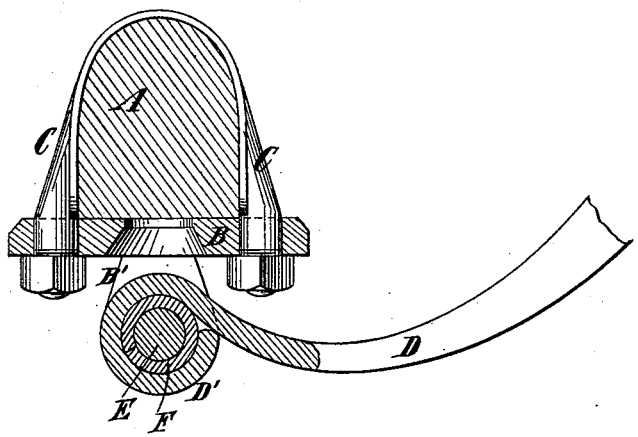
Figure 2:
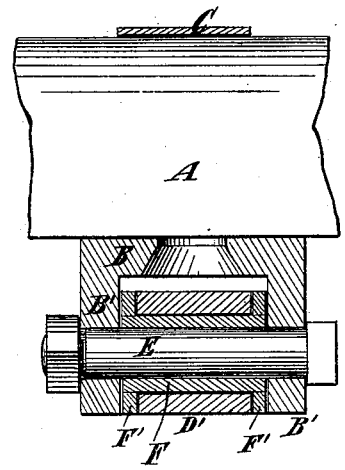
Figure 5:
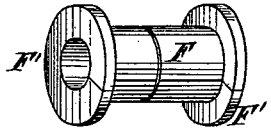
Figure 4:
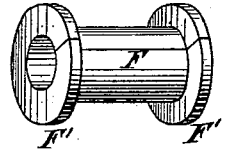
Figure 3:
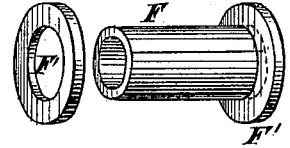
Figure 6:
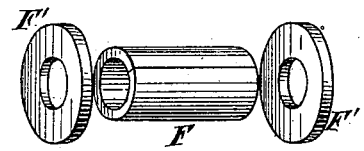

In the accompanying drawings, Figure 1 represents a transverse section of a side bar, an end portion of a spring-arm, and a coupling provided with my bushing. Fig. 2 represents a longitudinal section of a portion of the cross-bar and a sectional view of the coupling and bushing. Fig. 3 represents a perspective view of the form of bushing shown in Figs. 1 and 2, one of the heads or flanges being detached; and Figs. 4, 5, and 6 illustrate bushings of modified form, also embodying my invention.

Similar letters of reference designate corresponding parts in all the figures.

A designates an ordinary side bar, and B designates a clip-plate secured thereon by clips C.

D designates the spring or spring-arm, which is provided at the end with an eye, D'. This eye fits or is received between two lugs, B', on the clip-plate B, and is coupled therewith by a bolt, E.

The bushing is composed of a tube or cylinder, F, adapted to fit snugly between the bolt E and the eye D', and heads or flanges F' at the ends of the cylinder or tube F, which fit between the sides or ends of the eye and adjacent lugs or ears B'.

The bushing F F' may be made in various ways, but in any case is made of leather, which is compressed to increase its density and hardness, and which is molded or spun into proper form by means of dies or molds or otherwise.

The bushing shown in Figs. 2 and 3 is composed of a piece of leather rolled into the form of a cylinder or tube, F, and heads or flanges F', which consist of annular disks slipped upon the outside of the cylinder or tube and secured by cement or otherwise. In inserting the bushing in place, the tube or cylinder, having one head on it, may be slipped through the eye D', after which the other head or flange is secured on the tube or cylinder.

The bushing shown in Fig. 4 has the tube F and heads or flanges F' all formed from one piece of leather. This bushing is made by rolling the leather into the form of a tube and then turning the heads or flanges outward by spinning or otherwise. The joint made by the meeting edges of the piece of leather may or may not be made with cement. To insert this bushing in the eye D', one of the heads or flanges F' must be turned down, so as to form a continuation of the cylinder or tube.

The bushing shown in Fig. 5 is composed of two parts, each forming a part of the tube, and one head or flange F'. The two parts of this bushing are inserted into the eye from opposite sides, and they may be cemented together or not, as may be desired.

In the bushing shown in Fig. 6 the heads or flanges F' consist of annular disks with holes equal in diameter to the internal diameter of the tube F. These heads or flanges are cemented or otherwise secured to the end of the tube F, one of them being so secured after the tube is inserted in the eye D'. The leather from which the bushings are made, whether compressed or not, is treated or impregnated with graphite or plumbago to reduce friction. This bushing prevents rattling and noise resulting from the direct contact of metal with metal, and it is very durable. This bushing may be made of waste scraps of leather, and hence will cost but little.

I am not seeking to produce an elastic cushion, and my compressed leather bushing is anything but an elastic cushion. It is compressed so as to be as hard as possible. It answers all purposes of an elastic cushion, and has the additional advantage that it will wear longer than the metal itself. When coated or treated with graphite the friction of the eye D' upon it is greatly lessened and there will be no squeaking.

What I claim as my invention, and desire to secure by Letters Patent, is—

1. As a new article of manufacture, a bushing for couplings, consisting of leather impregnated with plumbago, substantially as and for the purpose described.

2. As a new article of manufacture, a bushing for couplings, consisting of leather compressed to increase its density and impregnated with plumbago, substantially as and for the purpose described.

EDWARD STORM.

Witnesses:
HENRY E. LOSEY,
C. B. HERRICK.